United States Patent

Kirk et al.

[11] 3,836,236
[45] Sept. 17, 1974

[54] MIRROR MOUNT FOR HIGH POWER LASERS

[75] Inventors: Russell F. Kirk, Sunnyvale; Frederick E. Moreno; Jack D. Foster, both of Los Altos, all of Calif.

[73] Assignee: GTE Sylvania Incorporated, Mountain View, Calif.

[22] Filed: Nov. 24, 1972

[21] Appl. No.: 308,988

[52] U.S. Cl. ................. 350/310, 350/288, 331/94.5
[51] Int. Cl. ............................................. G02b 5/08
[58] Field of Search ........... 350/310, 288; 331/94.5; 165/139, 81, 82, 136, 166, 168, 170, 171

[56] References Cited
UNITED STATES PATENTS

| | | | |
|---|---|---|---|
| 3,007,088 | 10/1961 | Diebold | 317/234 |
| 3,371,287 | 2/1968 | Haddad | 350/288 |
| 3,478,608 | 11/1969 | Met | 350/310 |
| 3,534,291 | 10/1970 | Martin | 331/94.5 |
| 3,637,296 | 1/1972 | McLafferty | 350/310 |
| 3,683,297 | 8/1972 | Hobart | 350/310 |
| 3,708,223 | 1/1973 | Sorensen | 350/310 |
| 3,718,182 | 2/1973 | Rossetti | 165/166 |

*Primary Examiner*—Ronald L. Wibert
*Assistant Examiner*—Michael J. Tokar
*Attorney, Agent, or Firm*—John F. Lawler; Norman J. O'Malley; Elmer J. Nealon

[57] ABSTRACT

A mirror mount for a high power laser includes a liquid-cooled backing plate resiliently pressed against the fluid-covered back side of a mirror seated in the recess of a mounting ring. The mating surfaces of the backing plate and mirror are lapped or otherwise precisley formed with flat plane shapes and the thin fluid film between them improves thermal conductivity at the junction and prevents shear stress between mirror and plate. The backing plate is resiliently pressed against the mirror by a clamping ring through an O-ring. The portion of the backing plate through which the coolant passes is immediately adjacent to the portion of the mirror from which the incident laser beam is reflected so as to efficiently remove heat generated by mirror absorption of beam energy. The peripheral edges of the backing plate and mirror are loosely held in the mounting ring to accommodate thermal expansion and contraction of the parts without stress or distortion.

7 Claims, 5 Drawing Figures

PATENTED SEP 17 1974  3,836,236

MIRROR MOUNT FOR HIGH POWER LASERS

BACKGROUND OF THE INVENTION

This invention relates to lasers and more particularly to an improved mirror mount for high power lasers.

The recirculation of a coherent light beam within a laser cavity requires the use of one or more mirrors to redirect or reflect the generated beam through the active region of the laser. Proper operation of the laser requires that the reflecting plane of each mirror must be precisely positioned and maintained relative to the other parts of the system. A problem arises when heat generated by absorption of beam energy by the mirror causes thermal expansion and contraction of the mirror and adjacent parts of the mount so as to produce a distortion of the reflecting plane of the mirror. This produces a corresponding deviation in the direction of the reflected rays of the beam which necessitates adjustment of all or part of the laser optical system or requires the use of other compensating techniques which compromise performance of the system.

In multi-pass lasers wherein the laser beam is recirculated through the lasing medium two or more times, a single mirror, called a folding mirror, is often used to reflect two or more passes of the beam within the cavity. In this case, absorption of heat by the mirror is greater because of the several reflections of the beam and thus the tendency of reflecting plane distortion is greatly increased. The problem is further aggravated with an increase in the power of the laser beam. By way of example, in a high power laser having 2,000 watts of internally circulating beam power and a folding mirror which reflects the beam three times and absorbs 1 percent of the energy with each reflection, the mirror absorbs 60 watts of energy continuously.

Prior art techniques for cooling laser mirrors have generally been directed to removing heat at the peripheral edges of the mirror. The difficulty with this technique is that the tight engagement between the mirror edge and mounting ring required for efficient heat transfer also constrains thermal expansion of the mirror so that distortion of the reflecting plane results. In some instances of prior practice, such distortion is compensated in part by grinding an offsetting curvature in the mirror. Such a compensating curvature, however, involves costly additional mirror preparation and further limits the use of the mirror to operation of the laser at one power level.

Another technique is to use but one mirror for each beam reflection so as to limit the heating of the mirror. This is not only costly but the number of elements in the system also complicates adjustment procedures.

OBJECTS AND SUMMARY OF THE INVENTION

An object of this invention is the provision of an improved mount for a laser mirror which facilitates rapid efficient cooling of the mirror.

Another object is the provision of a laser mirror mount in which heat removal takes place immediately adjacent to the beam reflection points on the mirror, i.e., at the source of the heating.

A further object is the provision of a junction between the cooling member and the rear surface of the mirror which has a high heat transfer characteristic.

Still another object is the provision of a laser mirror mounting assembly in which thermal expansion and contraction of the parts is accommodated while maintaining the mirror reflecting surface in a fixed position.

These and other objects of the invention are achieved by a mirror mount assembly which yieldably presses the mirror axially against a seat that defines the reference plane for determining the position of the reflecting surface and which removes heat from the mirror through its back side adjacent to the laser beam reflecting points while permitting stress-free differential radial thermal expansion and contraction of the mirror and adjacent mount parts. An antifriction or fluid film between mating surfaces of the backing plate and mirror not only insures good thermal conductivity at the junction but also eliminates shear stress between mirror and backing plate.

DESCRIPTION OF PREFERRED EMBODIMENTS

Figure 1:
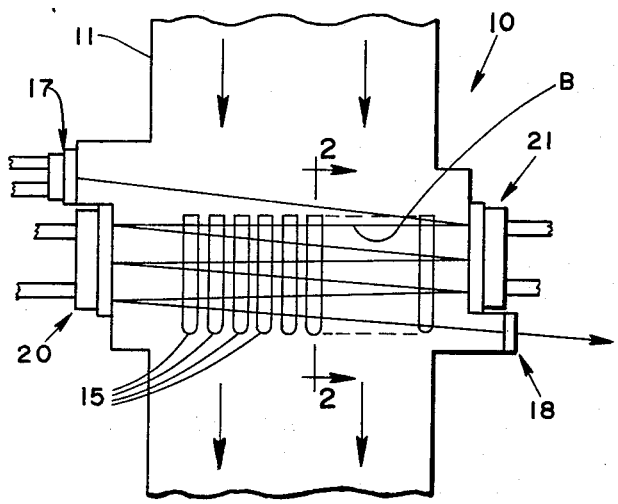
FIG. 1 is a schematic plan view of a multi-pass laser with folding mirrors embodying the invention.
Figure 2:
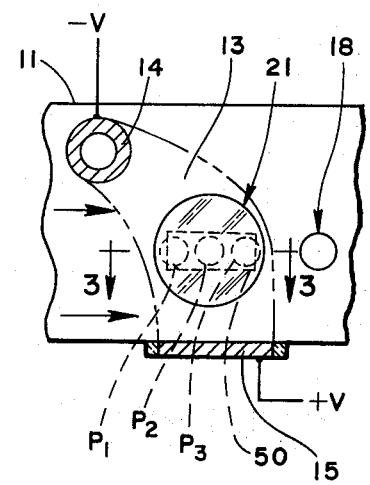
FIG. 2 is a plan view of one of the folding mirrors as viewed on line 2—2 of FIG. 1.

Referring now to the drawings, an embodiment of the invention is shown in conjunction with a gas transport laser 10 having a closed duct 11 through which gas, such as a $CO_2$ mixture, flows in the direction of the arrows. The active region of the laser comprises a zone 13, see FIG. 2, between transversely extending vertically spaced electrodes 14 and 15 connected to an external source of power. The positive electrode or anode 15 may be segmented as shown. A gas transport laser of this type is described in greater detail in U.S. Pat. application Ser. No. 290,545 assigned to the assignee of this invention. An electric discharge between these electrodes traverses the flowing gas and generates a coherent light beam B for circulation within the laser cavity defined by terminal mirror 17 and output coupler mirror 18. In order to minimize the overall size of the laser cavity, the beam is reflected several times through the cavity by means of intermediate folding mirror assemblies 20 and 21 on opposite sides of the duct.

Figure 3:
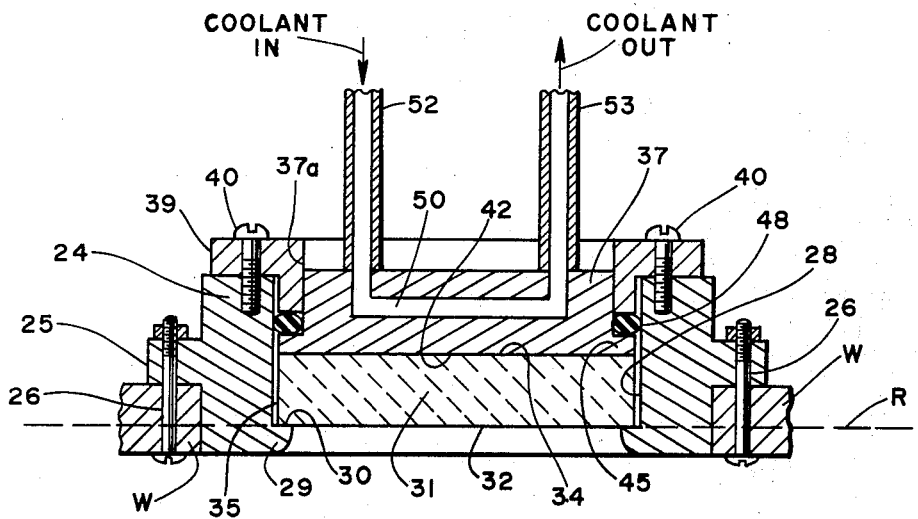
FIG. 3 is a greatly enlarged transverse section of the mirror and mount assembly showing the details of construction.

This invention is directed to an improved construction of mirror assemblies 17, 20 and 21 in which the cooling of the mirror and the associated mounting parts is facilitated to maintain the reflecting or reference plane R, see FIG. 3, of each mirror stable and constant. The following description of mirror assembly 21 is generally applicable to the other mirror assemblies as well.

Mirror assembly 21 comprises an outer mounting ring 24 having a rim 25 secured to the wall W of the duct by bolts 26. Ring 24 has an internal cylindrical surface 28 and an inwardly projecting annular front lip 29 defining a shoulder 30 for receiving and seating a disc-like mirror 31. The outer or reflecting surface 32 of the mirror is ground precisely flat and lies in the fixed optical reference plane R when the mirror is seated against shoulder 30 as shown. The opposite or rear surface 34 of the mirror is similarly precisely ground flat and parallel to front surface 32 and the edge surface 35 of the mirror is cylindrical. The diameter of mirror 31 is slightly less than the diameter of ring surface 28 as shown to provide freedom of differential radial expansion of the parts when the mirror becomes heated.

Figure 4:
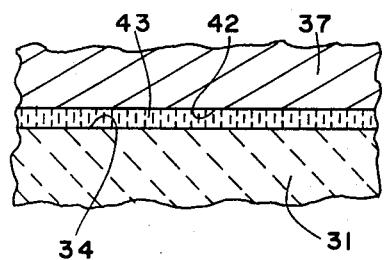
FIG. 4 is a greatly enlarged portion of FIG. 3 showing the fluid film between adjacent faces of the backing plate and mirror.
Figure 5:
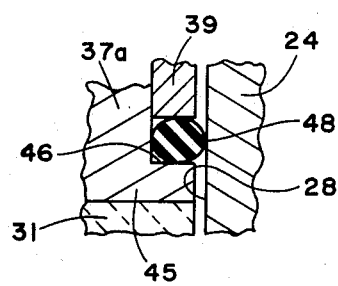
FIG. 5 is a greatly enlarged portion of FIG. 3 showing details of the O-ring placement.

In order to hold the mirror against shoulder 30, a cylindrical backing plate 37 is clamped against the rear surface of mirror 31 by a ring-like clamp member 39 secured by screws 40 to the rear face of outer ring 24. Backing plate 37 has a front surface 42 which is ground or lapped precisely flat to maintain parallelism with the entire area of rear surface 34 of the mirror. An important feature of this invention is the provision of a film 43 of low viscosity fluid or lubricant, see FIG. 4, between mating surfaces 34 and 42 of the mirror and backing plate, respectively. The fluid when compressed between these surfaces essentially eliminates minute air pockets in the junction and insures good thermal conductivity across the junction. By way of example, the fluid in film 43 may comprise Octoil brand diffusion pump fluid manufactured by Consolidated Vacuum Corporation and having a viscosity at 80° F. of about 52 centipoises. The film thickness is in the order of 0.001 inch.

Plate 37 has a front flange 45 with an outer diameter slightly less than the inside diameter of ring 24 and substantially greater than the outer diameter of the rear portion 37a of plate 37. The rearwardly facing annular surface 46 of rim 45 provides a shoulder or seat for an O-ring 48 which extends entirely around the backing plate. The forward portion of clamp member 39 engages O-ring 48 and through it forces backing plate 37 against the mirror for yieldingly holding the latter against shoulder 30 of mounting ring 24. The O-ring further provides an effective hermetic seal between ring 24 and plate 37 and accommodates differential radial thermal expansion and contraction of these parts.

In order to dissipate heat generated in the mirror by laser beam absorption, the backing plate is cooled by means of an elongated passage 50 formed in the central part of the plate and connected to external conduits 52 and 53. Passage 50 preferably is formed diagonally across the central portion of plate 37 proximate to the areas $P_1$, $P_2$ and $P_3$ of incidence of laser beam B on the mirror, see FIG. 2. A coolant such as water is continuously circulated through conduit 52, passage 50 and conduit 53 to remove heat from the mirror as closely as possible to areas $P_1$, $P_2$ and $P_3$ of generation of the heat without affecting the normal function of the mirror. Backing plate 37 preferably is made of copper or the like.

An important feature of the invention is that the mounting assembly provides for differential thermal expansion of the mirror, backing plate and outer ring without affecting the position of the reflecting surface 32 of the mirror in the reference position. Axial expansion of the parts, i.e., in a direction normal to plane R, is accommodated by O-ring 48. Radial expansion of the ports is accommodated by the tolerance or play between the inner surface of mounting ring 24 and the outer surfaces of the mirror, backing plate and clamp member so as to avoid stressing and consequent distortion of the mirror upon radial expansion or contraction of these parts. Finally, fluid film 43 between adjacent surfaces of the mirror and backing plate eliminates shear stress between these components due to relative radial movements and maintains an efficient path for transfer of the heat from the rear of the mirror to the backing plate.

While the embodiment of the invention is described above in conjunction with a mirror having plane reflecting and back surfaces, it will be understood that the invention may be practiced with utility and advantage with optical reflectors having surfaces with nonplanar shapes as may be desired or required. For example, the reflector may have spherical surfaces or may be formed with a grooved reflecting surface as in the diffraction grating described in copending U.S. Pat. application Ser. No. 304,647 assigned to the assignee of this invention. Efficiency in the removal of heat from the reflector and prevention of deformation due to thermally and mechanically induced stress insures that the shape of the reflecting surface remains unchanged.

What is claimed is:

1. A reflector mounting assembly comprising
   a reflector having a circumferential edge and opposed surfaces extending transversely of the direction of light beam incidence thereon,
   an outer member surrounding said edge of said reflector and having an interior transverse dimension greater than the corresponding exterior dimension of the reflector whereby said reflector is expandable and contractible within and relative to said outer member, said member having an abutment engageable with the peripheral portion of one of said reflector surfaces and defining the position of the reflecting surface of the relfector,
   a cooling plate having a surface disposed in heat conducting relation adjacent to and substantially coextensive with and having the same shape as the other surface of the reflector, and
   means for yieldably axially forcing said plate against said other surface of the reflector whereby to firmly seat said one surface of the reflector against said abutment.

2. The mounting assembly according to claim 1 with an antifriction film between the adjacent surfaces of the reflector and cooling plate.

3. The mounting assembly according to claim 2 in which said adjacent surfaces are plane.

4. The mounting assembly according to claim 1 in which said last named means comprises a clamp secured to said outer member, and an O-ring disposed between said clamp and the rear surface of said reflector.

5. An assembly for mounting a mirror on the housing of laser apparatus comprising
   an annular member secured to said housing, said member having a lip defining a reference position,
   a mirror disposed within said member in radially movable relation thereto and in abutment with said lip and having a reflecting surface in said reference position, said mirror having a plane back surface opposite said reflecting surface,
   a cooling plate having a plane surface adjacent to said back surface of said mirror,
   means for clamping said plate against said mirror for seating the latter against said lip, and lubricant means between adjacent surfaces of said cooling plate and mirror whereby to permit stressless differential radial thermal expansion of the plate and mirror.

6. The assembly according to claim 5 in which said lubricant means comprises a film of low viscosity fluid.

7. The assembly according to claim 5 in which said clamp means comprises a ring secured to said member, and a resilient seal element between said ring and said cooling plate.

* * * * *